United States Patent
Okamoto et al.

(10) Patent No.: US 6,917,137 B2
(45) Date of Patent: Jul. 12, 2005

(54) ELECTRIC MOTOR AND MANUFACTURING METHOD THEREFOR

(75) Inventors: Takashi Okamoto, Yamanashi (JP);
Tsuyoshi Furuya, Yamanashi (JP);
Katsuhiko Imabori, Tokyo (JP)

(73) Assignee: Fanuc Ltd., Yamanashi (JP)

( * ) Notice: Subject to any disclaimer, the term of this patent is extended or adjusted under 35 U.S.C. 154(b) by 10 days.

(21) Appl. No.: 10/393,976

(22) Filed: Mar. 24, 2003

(65) Prior Publication Data

US 2003/0197444 A1 Oct. 23, 2003

(30) Foreign Application Priority Data

Apr. 18, 2002 (JP) ......................................... 2002-116436

(51) Int. Cl.$^7$ ................................................ H02K 7/04
(52) U.S. Cl. ........................ 310/261; 310/51; 74/573 R
(58) Field of Search ........................ 74/573 R; 310/51, 310/261–262, 264–265, 267–268, 272

(56) References Cited

U.S. PATENT DOCUMENTS

| | | | | |
|---|---|---|---|---|
| 3,832,584 A | * | 8/1974 | DePaul ........................ 310/211 |
| 4,471,248 A | * | 9/1984 | Smetana ........................ 310/51 |
| 4,644,201 A | | 2/1987 | Tani et al. ..................... 310/51 |
| 5,306,123 A | * | 4/1994 | Day et al. ................. 417/423.7 |
| 5,491,598 A | * | 2/1996 | Stricklin et al. .......... 360/265.6 |
| 5,704,111 A | * | 1/1998 | Johnson et al. ............... 29/598 |
| 5,801,470 A | * | 9/1998 | Johnson et al. .......... 310/156.27 |
| 5,892,306 A | | 4/1999 | Lloyd ............................ 310/51 |
| 6,459,675 B2 | * | 10/2002 | Sohn ........................... 369/264 |

FOREIGN PATENT DOCUMENTS

| | | | | |
|---|---|---|---|---|
| DE | 3617474 | * | 11/1987 | ............ H02K/7/04 |
| FR | 1280370 | | 12/1961 | |
| JP | 29-5127 | | 5/1954 | ........... H02K/15/16 |
| JP | 56-86325 | * | 7/1981 | ............. G01M/1/02 |
| JP | 61-32771 | | 2/1986 | ........... H02K/15/16 |
| JP | 4-42755 | | 2/1992 | ........... H02K/15/02 |
| JP | 4-133637 | * | 5/1992 | ............. H02K/1/27 |
| JP | 4-334945 | * | 11/1992 | ............. H02K/7/04 |
| JP | 6-153427 | * | 5/1994 | ............. H02K/1/27 |
| JP | 6-66284 | | 9/1994 | ............ H02K/29/00 |
| JP | 8-65932 | * | 3/1996 | ............. H02K/1/27 |
| JP | 2000-184678 | * | 6/2000 | ............ H02K/29/00 |
| JP | 2000-321162 | | 11/2000 | ............. G01M/1/38 |
| JP | 2002-10588 | | 1/2002 | ........... H02K/15/16 |

OTHER PUBLICATIONS

Hütte, Taschenbuch für Betriebsingenieure (Betreibshütte), Band I: Fertigungsverfahren, Berlin 1964, pp. 617–625.

\* cited by examiner

*Primary Examiner*—Burton Mullins
(74) *Attorney, Agent, or Firm*—Staas & Halsey LLP

(57) ABSTRACT

At least one cavity is formed extending along the axis of rotation of a rotor. One or more elastic members are fitted into the cavity to balance the rotor. Once the elastic members are inserted in the cavity, they apply their own elasticity to the inner wall of the cavity, so that they are stably held in the cavity.

14 Claims, 7 Drawing Sheets

(a)

(b)

(b)

(a)

ELECTRIC MOTOR AND MANUFACTURING METHOD THEREFOR

BACKGROUND OF THE INVENTION

1. Field of the Invention

The present invention relates to an electric motor having a rotor and a manufacturing method therefor, and more specifically, to an electric motor capable of simple balance adjustment and a manufacturing method therefor.

2. Description of the Related Art

A rotor of an electric motor requires high-accuracy balance. If the mass distribution of a member that constitutes the rotor is deflected so that the center of gravity is deviated from the axis of rotation, for example, the rotor shakes as it rotates and applies an undesired load to the rotating shaft member.

The following methods for avoiding such an awkward situation occurring are known; (a) loading the rotor with resin, (b) cutting the rotor, and (c) fitting a washer on a projection that protrudes outward from the rotor.

However, these conventional methods involve the following problems. First, the method (a) in which the balance is adjusted by loading resin into the rotor requires a process of curing the resin as well as equipment for loading the resin, so that it lacks in simplicity and economical efficiency. Further, the manufacturing cycle time lengthens by a margin corresponding to the resin curing time, thereby influencing the productivity. If the resin is not cured satisfactorily, it may possibly leak out of the rotor.

According to the method (b) in which the balance is adjusted by cutting the rotor, cuttings may possibly be produced and adhere to the rotor. In some cases, moreover, the cutting work may damage the rotor entirely or partially.

According to the method (c) in which the balance is adjusted by fitting an elastic member on a projection on the rotor, furthermore, the volume of the space that is occupied by the rotor during rotation increases, so that the capacity of the electric motor must be increased correspondingly. Thus, miniaturization of the motor is hindered.

OBJECT AND SUMMARY OF THE INVENTION

Accordingly, the object of the present invention is to provide an electric motor of which a rotor can be adjusted in balance by simple processes and a method for manufacturing such an electric motor.

In order to achieve the above object, according to the present invention, there is provided an electric motor having a rotor, in which the rotation balance of the rotor is adjusted in a manner such that an elastic member is inserted into a cavity extending in the direction of a rotating shaft in the rotor.

More specifically, in the electric motor of the invention, at least one cavity is formed in the rotor so as to extend along the axis of rotation of the rotor. For balance adjustment, moreover, at least one elastic member is fitted into the cavity.

The elastic member may be a cylindrical elastic member that is urged to expand in the direction of the radius of rotation of the rotor by elasticity. This elastic bias in the expanding direction serves to anchor the elastic member to the rotor after the elastic member is fitted into the cavity. For example, corrugate or latticed grooves may be formed on the outer surface of the cylindrical elastic member. The elastic member may alternatively be a planar elastic member that has an outer peripheral portion urged to expand in the direction of the radius of rotation of the rotor by elasticity. In this case, the elastic member can be anchored to the rotor after it is fitted into the cavity.

A manufacturing method for an electric motor according to the invention comprises a step of fitting elastic members for balance adjustment into at least one cavity formed in a rotor so as to extend along the axis of rotation of the rotor. The elastic member to be fitted into the cavity may be a cylindrical elastic member that is urged to expand in the direction of the radius of rotation of the rotor by elasticity. Preferably, for example, corrugate or latticed grooves are formed on the outer surface of the cylindrical elastic member. These grooves can enhance the force of engagement between the rotor and the elastic member. The elastic member may alternatively be a planar elastic member that has an outer peripheral portion urged to expand in the direction of the radius of rotation of the rotor by elasticity. For example, the outer peripheral portion of the planar elastic member may be bent so that it can be urged elastically to expand outward.

Thus, according to the invention, at least one cavity must be formed extending along the axis of rotation of the rotor, in order to insert the elastic member for balance adjustment into the rotor. The cavity may be in the form of a recess or through hole. In general, the rotor of an electric motor is formed by laminating electromagnetic steel sheets of specific shapes to one another. Therefore, a recess can be formed in the resulting laminate by suitably shaping the steel sheets. Alternatively, the recess may be formed by cutting the rotor. The elastic member to be fitted into the cavity may be a coil spring or plate spring of solid resin or metal.

If an elastic member having a substantial elastic force that acts in the direction of the axis of rotation is inserted into the cavity, it is necessary only that the elastic force be received to prevent the elastic member from slipping out. If the elastic member is cylindrical, its cross section in the direction of the radius of rotation may be C- or U-shaped so that the whole body of the elastic member can enjoy elasticity. This elastic member is designed so that it has a cross section with a radius of rotation a little wider than that of the cavity before it is inserted into the cavity. When the elastic member is inserted into the cavity, it is anchored to the rotor by its elasticity.

The cross section of the elastic member in the direction of the radius of rotation is not limited to the shape of a C or U. It may alternatively be in the shape of a polygon having one side cut or any other desired shape that is partially cut. The elastic member must only be elastic enough to be anchored to the rotor.

According to the electric motor manufacturing method of the invention, an electric motor is manufactured by using the rotor in which one or more elastic members are fitted into a cavity (recess or through hole), depending on the necessary balancing conditions for the adjustment of rotation balance. The elastic members may be fitted into the cavity with use of a push-in mechanism that operates by an oil pressure, compressed gas, or an electric motor.

According to the present invention, balance adjustment of the rotor of the electric motor can be completed by only a process for inserting the elastic members, and never entails processes that are required by the prior art. Since no cutting work is required, moreover, there is no problem of cuttings. Since the elastic members are inserted into the rotor, the capacity of the rotor during rotation can be restricted, so that the space in the motor can be utilized effectively. Thus, the electric motor can be downsized with ease.

BRIEF DESCRIPTION OF THE DRAWINGS

FIGS. 1A and 1B show an example of a rotor of an electric motor adjusted in balance according to an embodiment of the present invention, in which FIG. 1A is a sectional view taken sideways and FIG. 1B is a plan view of the rotor taken from the right-hand side of FIG. 1A;

FIGS. 4A and 4B are views illustrating an elastic member different from the one shown in FIGS. 1 and 2, in which FIG. 4A is a side view and FIG. 4B is a plan view of the elastic member taken from the right-hand side of FIG. 4A;

DETAILED DESCRIPTION OF THE PREFERRED EMBODIMENT

Figure 1:
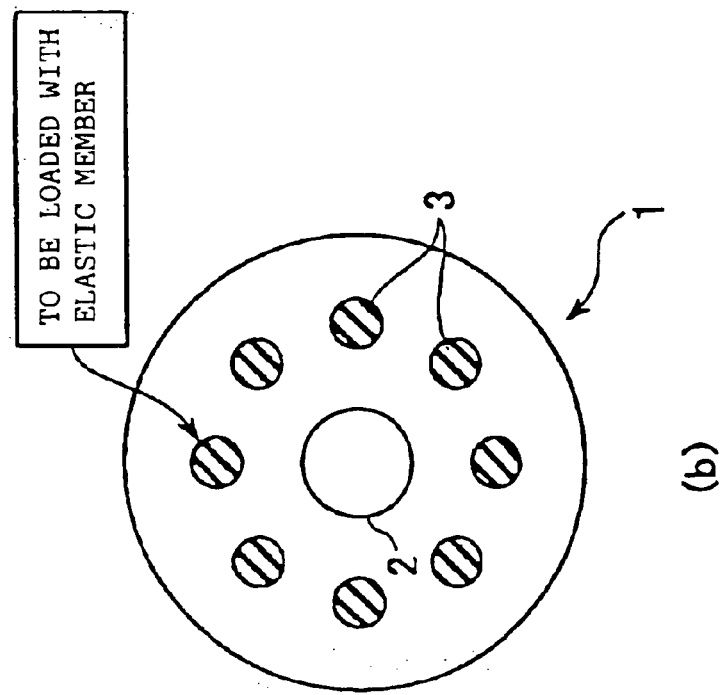
Figure 1:
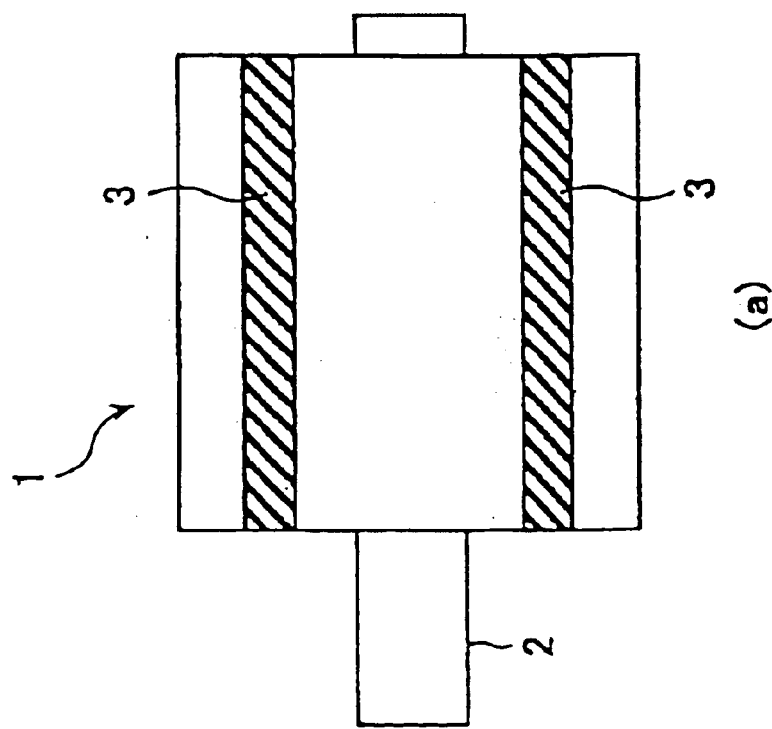

As shown in FIGS. 1A and 1B, a rotor 1 of an electric motor is cylindrical and has a rotating shaft 2 that penetrates its central portion. The rotor 1 is provided with a plurality of cavities 3 that extend along the shaft 2. Each cavity 3 has the form of a recess or through hole, and is fitted with an elastic member for balance adjustment. The elastic member will be mentioned later.

The number, positions, size, etc. of the cavities 3 are settled depending on the execution conditions for the balance adjustment, including the size, weight, etc. of the elements used. Although a plurality of cavities 3 are normally used, only one cavity 3 may be used with the same result unless the balance adjustment is hindered. Normally, moreover, the elastic members are fitted individually into all the cavities 3. In some cases, however, the elastic members may be fitted into only some of the cavities 3.

Further, two or more elastic members with different shapes, weights, etc. may be fitted into each cavity 3, depending on the mode of balance adjustment, which will be mentioned later.

Figure 2:
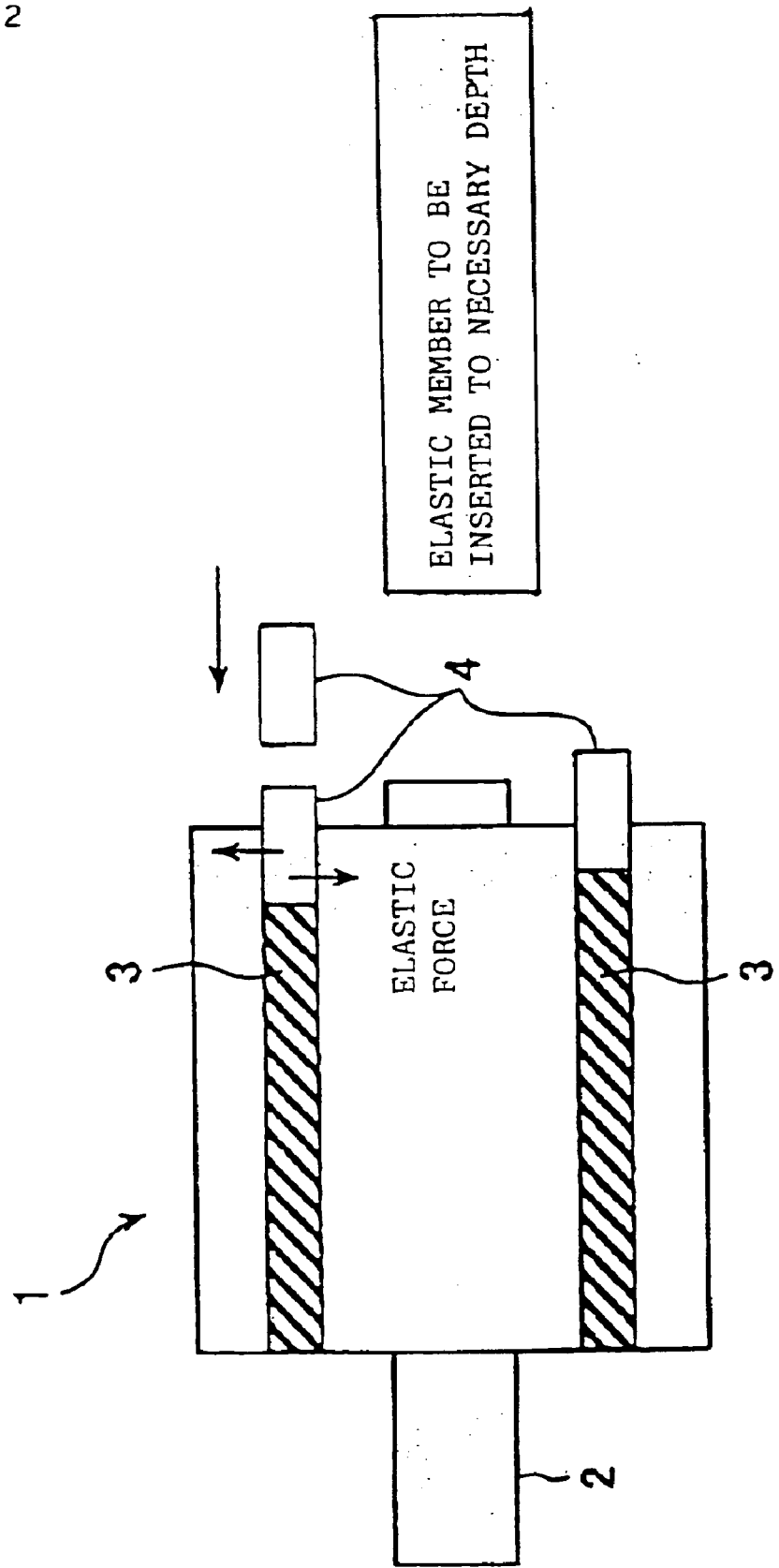
FIG. 2 is a view showing the way elastic members are fitted into the rotor shown in FIGS. 1A and 1B.

FIG. 2 shows the way elastic members 4 are fitted in the rotor 1 shown in FIGS. 1A and 1B. In a natural state, as shown in FIG. 2, each elastic member 4 has an outside diameter a little greater than the inside diameter of each cavity 3, and is elastically deformable in its radial direction at the least. This property can be realized if each elastic member 4 is formed of rubber-like resin bulk, coil spring or the like, for example. As shown in FIG. 2, the elastic members 4 are inserted to a necessary depth for balance adjustment in their corresponding cavities 3. The depth of insertion of the elastic members 4 can be adjusted according to the length, number, weight, etc. of the elastic members 4. The length can be selected freely if each elastic member 4 can be cut to any desired length. If the elastic members 4 are formed of short pellets, the depth can be adjusted by varying the number of elastic members. Further, elastic members 4 having the same size, same shape, and different specific gravities may be used properly.

In the example shown in FIG. 2, each elastic member 4 in its natural state has an outside diameter a little greater than the inside diameter of each cavity 3, and is elastically deformable in its radial direction at the least. In this case, a leftward external force must be applied to the elastic members 4 to push them individually into the cavities 3. Since this operation is simple, however, it can utilize a simple mechanical force such as a force of pressure from a plunger that is driven by means of an air cylinder or a push of a robot.

When each elastic member 4 is inserted into its corresponding cavity 3, it applies its elastic force, which acts so as to increase its own diameter, to the cavity 3, so that it is anchored to the inner wall of the cavity 3. If the rotor 1 rotates, therefore, there is no possibility of the elastic member 4 shifting in or slipping out of the cavity 3. In order to prevent dust from getting into the cavity 3, however, the inlet opening of the cavity 3 may be closed by means of a suitable cap.

An example that uses elastic members 40 shaped differently from the elastic members 4 used in the example shown in FIG. 2 will now be described with reference to FIG. 3. In the example shown in FIG. 3, each cavity 3 is in the form of a recess, and constrictions 31 and 32 having a somewhat smaller diameter are formed near the inlet opening and the innermost part (base of the recess), respectively.

In a natural state, each elastic member 40 is an elastic body that is a little longer than the distance between the constrictions 31 and 32, and is elastically deformable along the axis of the rotating shaft 2. This property can be realized if each elastic member 40 is formed of a coil spring, for example. Flange-shaped end members 41 and 42 are attached individually to the opposite ends of the elastic member 40. The end members 41 and 42 have an outside diameter a little greater than the inside diameter of the constrictions 31 and 32. If a given force of pressure is applied to each elastic member 40 so that it is pushed in through the constriction 31, the elastic member 40 is elastically deformed, so that it can pass through the constriction 31.

Figure 3:
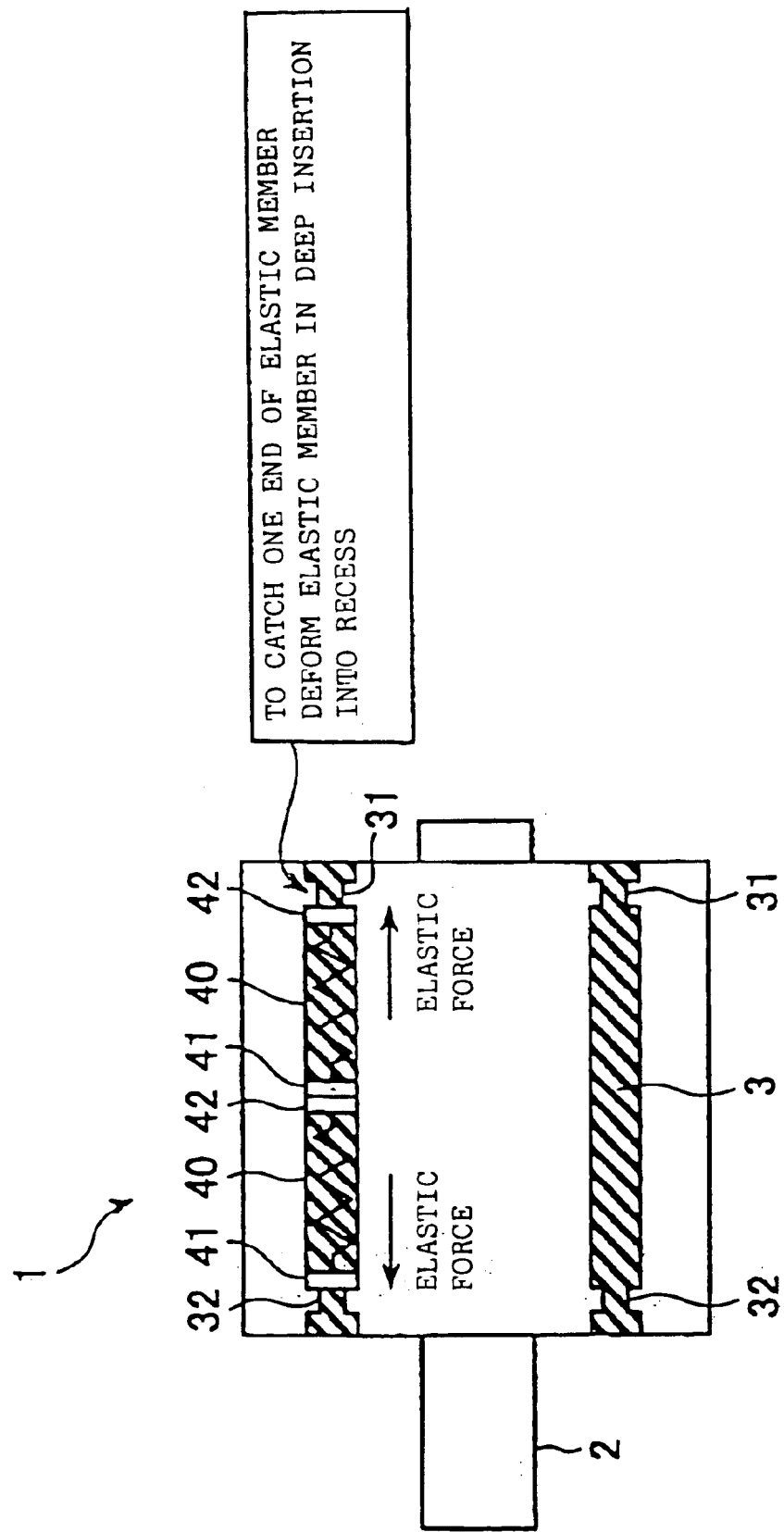
FIG. 3 is a view showing the way elastic members different from the ones shown in FIG. 2 are fitted into cavities of the rotor.
Figure 4:
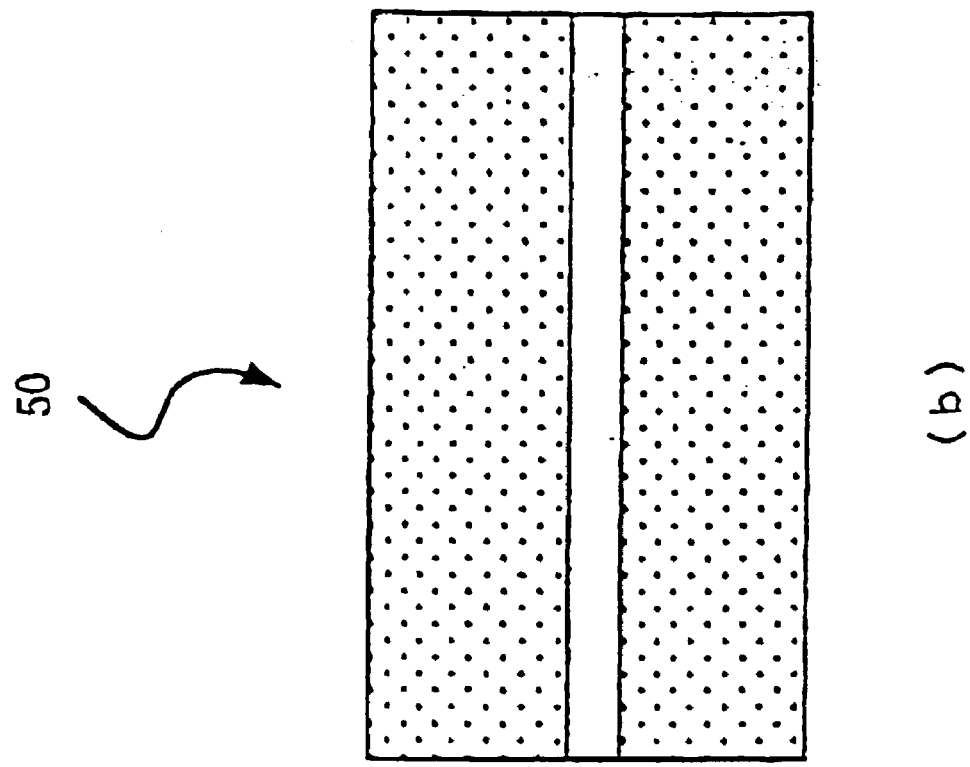
Figure 4:
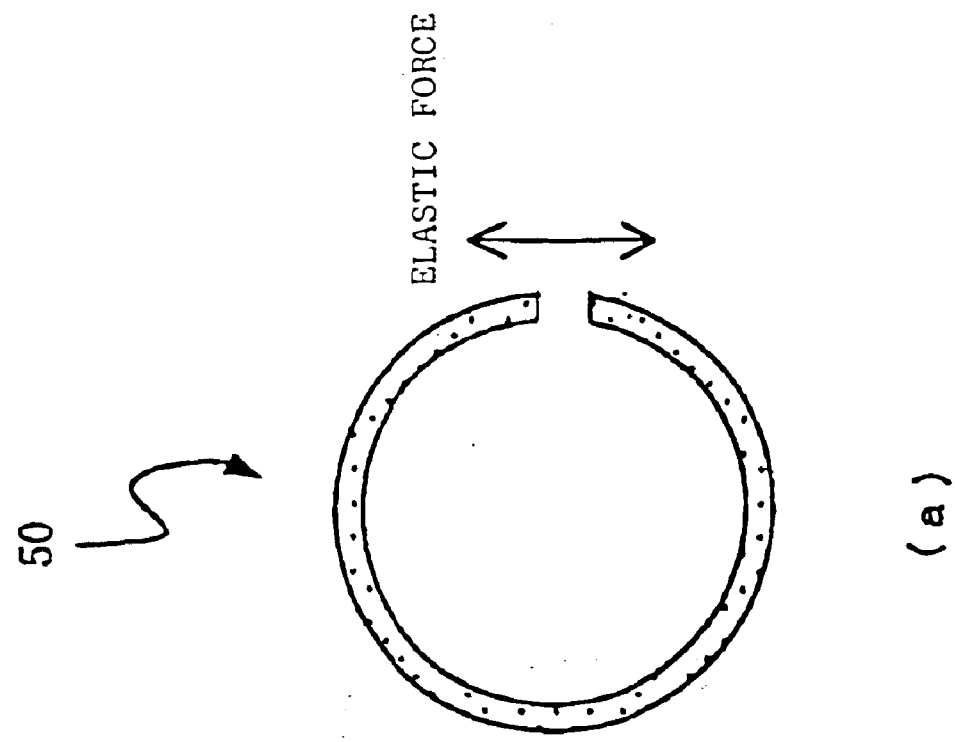
Figure 5:
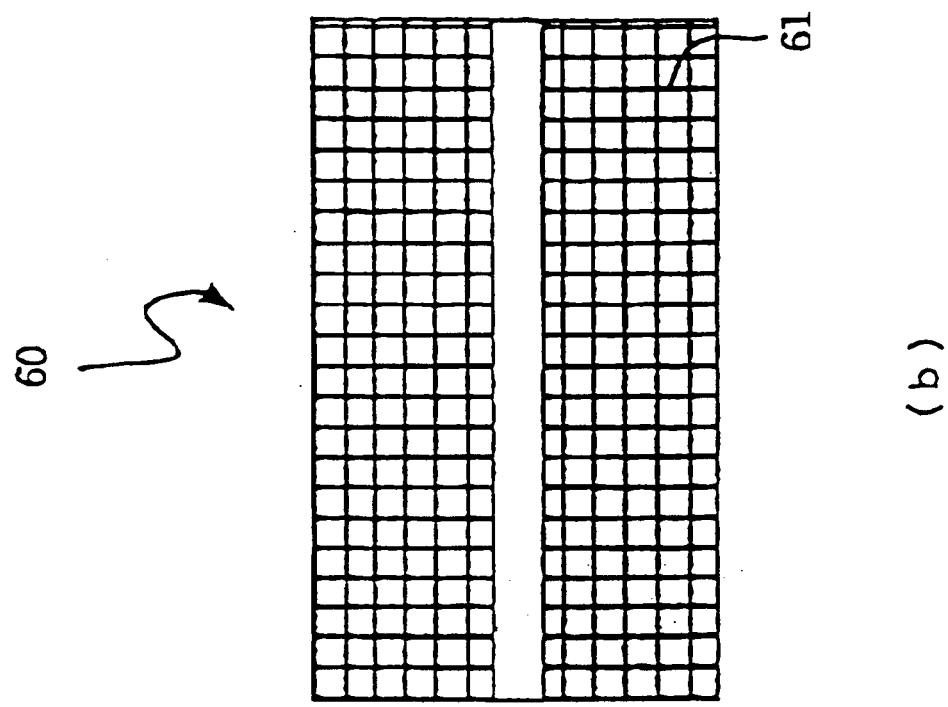
FIGS. 5A and 5B are views illustrating a modification of the elastic member shown in FIGS. 4A and 4B.
Figure 5:
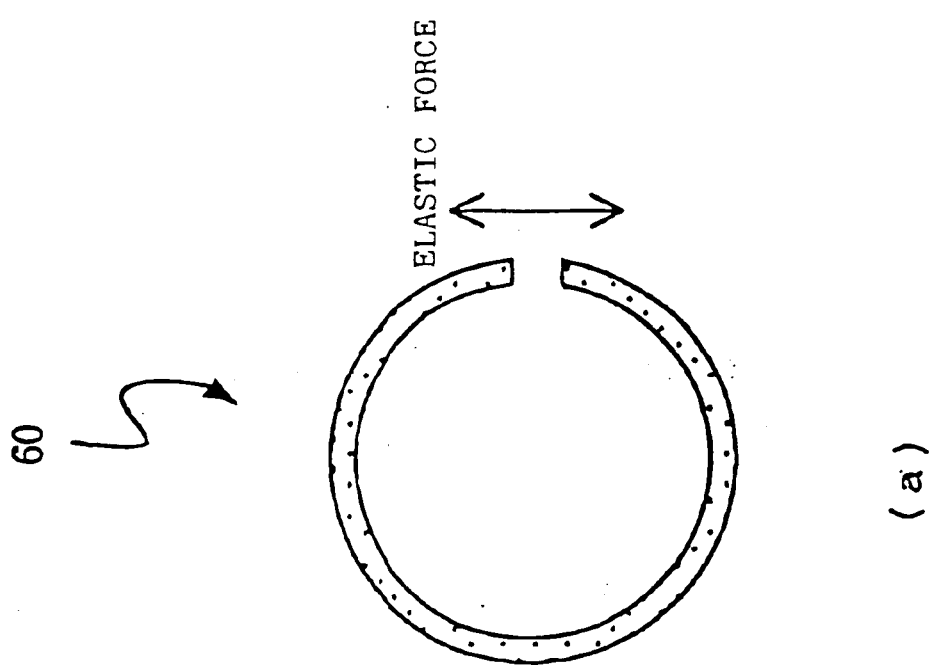
Figure 6:
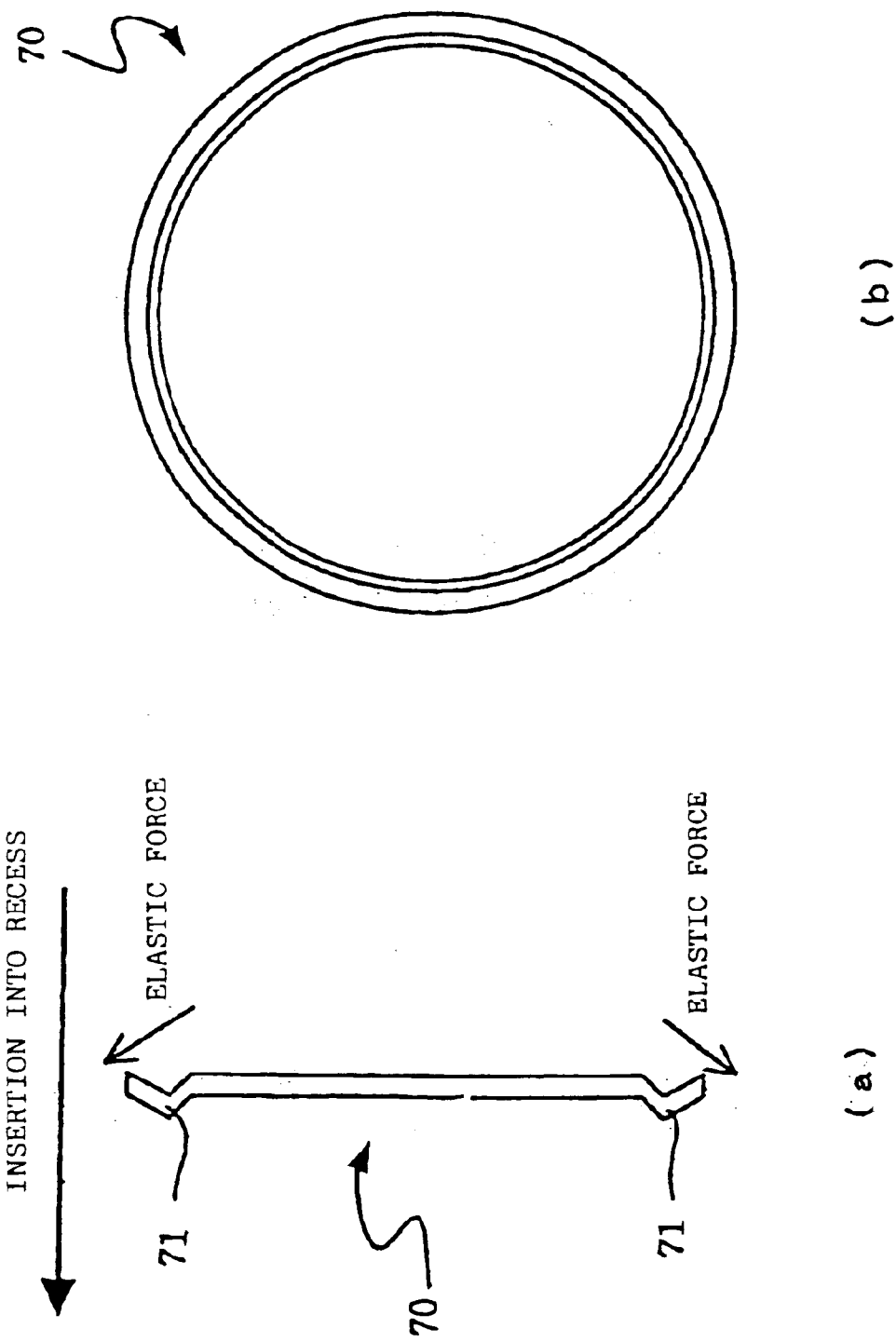
FIGS. 6A and 6B are views illustrating another modification of the elastic member.

In the example shown in FIG. 3, two elastic members 40 are inserted into each cavity 3. Depending on the contents of necessary balance adjustment, however, the elastic members 40 may not be inserted into some of the cavities 3, in some cases.

In the example shown in FIG. 3, the elastic members 40 can be also fitted into the cavities 3 if they are subjected to a leftward external force. Since this operation is simple, it can utilize a simple mechanical force such as a force of pressure from a plunger that is driven by an air cylinder or a push of a robot.

Once each elastic member 40 is inserted into that part of each cavity 3 which is situated between the constrictions 31 and 32, it is urged to extend its own length. Since its end portions run against the constrictions 31 and 32 with a reduced inside diameter, however, the elastic member 40 can be stably held in the cavity 3. If the rotor 1 rotates, therefore, there is no possibility of the elastic member 40 shifting in or slipping out of the cavity 3. In order to prevent dust from getting into the cavity 3, however, the inlet opening of the cavity 3 may be closed by means of a suitable cap.

Although the elastic members 4 or 40 are fitted individually into the cavities 3 of the rotor 1 in the embodiment described above, they may be replaced with elastic members in any other forms. FIGS. 4A to 6B show these alternative examples.

FIGS. 4A and 4B show a substantially cylindrical elastic member 50 that has a C-shaped cross section in the direction of the radius of rotation. The whole body of the elastic member 50 is elastic. The elastic member 50 is metallic, for example, and has a diameter (outside diameter of the C-shaped arc of FIG. 4A) a little greater than the inside diameter of the cavity 3 when it is in its natural state. When the elastic member 50 is fitted in the cavity 3, it is held so that the outside diameter of the C-shaped arc is reduced. In this case, it is necessary only that the elastic member 50 be released from the hold and left in the cavity 3 after it is inserted into the cavity 3. This operation can be carried out by means of a robot hand, for example.

The elastic member 50 once inserted into the cavity 3 is prevented from increasing its own diameter by the inner wall of the cavity 3, so that its elastic force acts on the inner wall. Thus, the elastic member 50 can be stably anchored to the inner wall of the cavity 3 (see FIGS. 1A and 1B). One or more elastic members 50 shown in FIGS. 4A and 4B may be fitted in each cavity 3 (or no elastic member 50 may be fitted in some of the cavities 3, in some cases).

An elastic member 60 shown in FIGS. 5A and 5B is a modification of the elastic member 50 shown in FIGS. 4A and 4B. The elastic member 60 has the same construction as the elastic member 50 except for latticed grooves that are cut in its outer peripheral surface, as shown in FIG. 5B. The cut grooves may be of any other pattern than a lattice. For example, they may be of a corrugate pattern. These grooves can enhance the force of engagement between the rotor 1 and the elastic member 60.

The elastic member 60, like the elastic member 50, is metallic, for example,; and has a diameter (outside diameter of the C-shaped arc of FIG. 5A) a little greater than the inside diameter of the cavity 3 when it is in its natural state. When the elastic member 60 is fitted in the cavity 3, it is held so that the outside diameter of the C-shaped arc is reduced. In this case, it is necessary only that the elastic member 60 be released from the hold and left in the cavity 3 after it is inserted into the cavity 3. This operation can be carried out by means of a robot hand, for example.

The elastic member 60 once inserted into the cavity 3 is prevented from increasing its own diameter by the inner wall of the cavity 3, so that its elastic force acts on the inner wall. Thus, the elastic member 60 can be stably anchored to the inner wall of the cavity 3. One or more elastic members 60 shown in FIGS. 5A and 5B may be fitted in each cavity 3 (or no elastic member 60 may be fitted in some of the cavities 3, in some cases).

FIGS. 6A and 6B show a disc-shaped elastic member 70 of which the outer peripheral portion is elastically deformable. The elastic member 70 is metallic, for example, and has a bent portion 71 on its outer peripheral portion. The bent portion 71 is elastically deformable in the diametrical direction of the elastic member 70.

In a natural state, the outside diameter of the elastic member 70 (outside diameter of the disc of FIG. 6B) is a little greater than the inside diameter of the cavity 3. When the elastic member 70 is fitted in the cavity 3, it is held so that the diameter of the disc is reduced. In this case, it is necessary only that the elastic member 70 be released from the hold and left in the cavity 3 after it is inserted into the cavity 3. This operation can be carried out by means of a robot hand, for example.

Once each elastic member 70 is inserted into each cavity 3, it is urged to extend its own diameter by the elastic action of the bent portion 71. However, it is arrested by the inner wall of the cavity 3 and applies its elastic force to the inner wall. Thus, the elastic member 70 can be stably anchored to the inner wall of the cavity 3.

Figure 7:
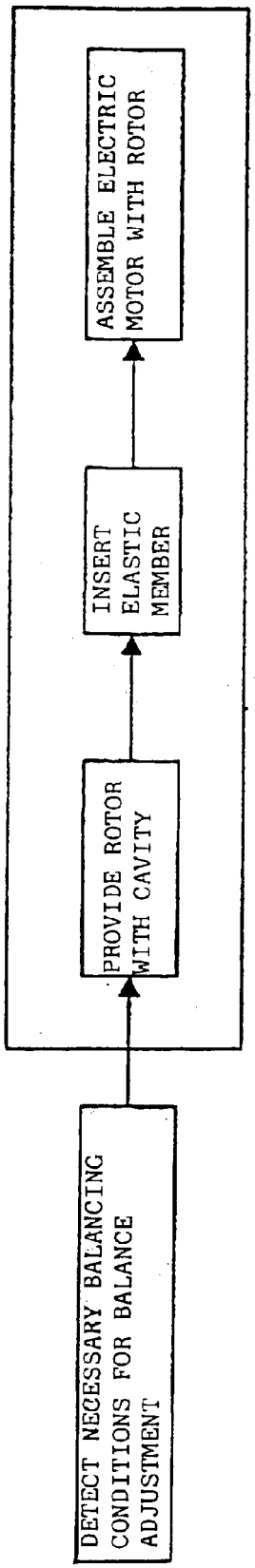
FIG. 7 is a flowchart illustrating typical processes of manufacturing the electric motor according to the invention.

FIG. 7 is a flowchart showing an outline of manufacturing processes for the electric motor for the case where any of the elastic members 4, 40, 50, 60 and 70 described above is used for balance adjustment.

A rotation test is first conducted for the electric motor before the insertion of the elastic members by using a measuring device or the like. By doing this, necessary balancing conditions (e.g., positions of the cavities and number of elastic members to be inserted in the cavities) for balance adjustment are detected. Subsequently, the cavities are formed by cutting the rotor. Alternatively, a rotor having cavities is manufactured according to the design reflecting the balancing condition thus obtained.

Then, a necessary number of elastic members are fitted into each cavity. If necessary, the inlet opening of the cavity is closed by means of a cap. The rotor, thus fitted with the elastic members for balance adjustment, is assembled into a product by conventional assembly processes.

According to the present invention, the balance adjustment of the rotor of an electric motor can be executed by simple processes without entailing high cost or taking much time. Since the necessary operation and configuration for the balance adjustment are simple, the balance adjustment can be automated with ease.

Since no cutting work is required, moreover, there is no problem of cuttings. Since the elastic members are inserted into the rotor, the capacity of the rotor during rotation can be restricted, so that the electric motor can be downsized with ease.

What is claimed is:

1. An electric motor having a rotor, comprising:
    at least one cavity formed in the rotor so as to extend along the axis of rotation of the rotor; and
    at least one C-shaped elastic member fitted into the cavity to change a weight distribution of the rotor and thereby adjust a balance of the rotor.

2. The electric motor according to claim 1, wherein the outer surface of at least one of the elastic members is provided with grooves.

3. The electric motor according to claim 1, wherein the elastic member is C-shaped as viewed in a cross section perpendicular to the axis of rotation.

4. The electric motor according to claim 3, wherein a plurality of the elastic members are fitted into the cavity.

5. An electric motor having a rotor, comprising:
    at least one cavity formed in the rotor so as to extend along the axis of rotation of the rotor; and
    at least one disc-shaped cylindrical elastic member urged to expand in a radial direction of the rotor by elasticity and fitted into the cavity to change a weight distribution of the rotor and thereby adjust a balance of the rotor.

6. The electric motor according to claim 5, wherein the elastic member is relatively thin along the axis of rotation as compared to the radial direction.

7. An electric motor having a rotor, comprising:
    at least one cavity formed in the rotor so as to extend along the axis of rotation of the rotor; and
    at least one elastic member fitted into the cavity to change a weight distribution of the rotor and thereby adjust a balance of the rotor,
    wherein the outer surface of at least one of the elastic members is provided with corrugate or latticed grooves.

8. An electric motor having a rotor, comprising:
    at least one cavity formed in the rotor so as to extend along the axis of rotation of the rotor; and at least one planar elastic member having an outer peripheral portion urged to expand in a radial direction of the rotor by elasticity and fitted into the cavity to change a weight distribution of the rotor and thereby adjust a balance of the rotor.

9. A manufacturing method for an electric motor, comprising a step of fitting C-shaped elastic members into at least one cavity formed in a rotor so as to extend along the axis of rotation of the rotor to change a weight distribution of the rotor and thereby adjust a balance of the rotor.

10. The manufacturing method for an electric motor according to claim 9, wherein at least one of the elastic members is urged to expand in a radial direction of the rotor by elasticity.

11. The manufacturing method for an electric motor according to claim 9, wherein the outer surface of at least one of the elastic members is provided with grooves.

12. The manufacturing method for an electric motor according to claim 9, wherein the outer surface of at least one of the elastic members is provided with corrugate or latticed grooves.

13. A manufacturing method for an electric motor, comprising a step of fitting elastic members into at least one cavity formed in a rotor so as to extend along the axis of rotation of the rotor to change a weight distribution of the rotor and thereby adjust a balance of the rotor, wherein at least one of the elastic members is a planar elastic member having an outer peripheral portion urged to expand in the radial direction of the rotor by elasticity.

14. An electric motor comprising:
   a rotor to rotate about an axis and forming a cavity therein extending along the axis; and
   a disc-shaped elastic member in the cavity to change a weight distribution of the rotor and thereby adjust a balance the rotor.

* * * * *